United States Patent Office 2,866,652
Patented Dec. 30, 1958

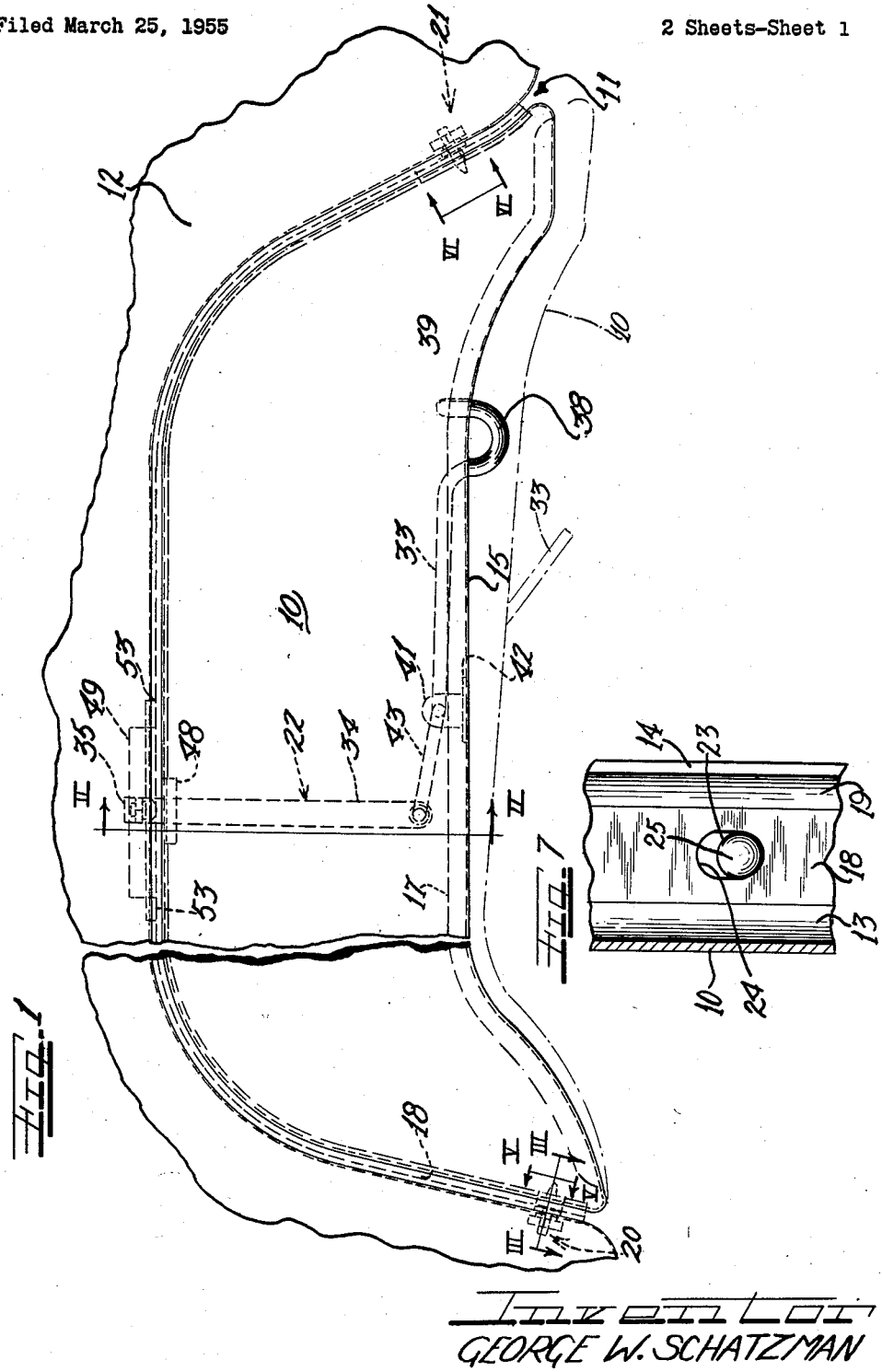

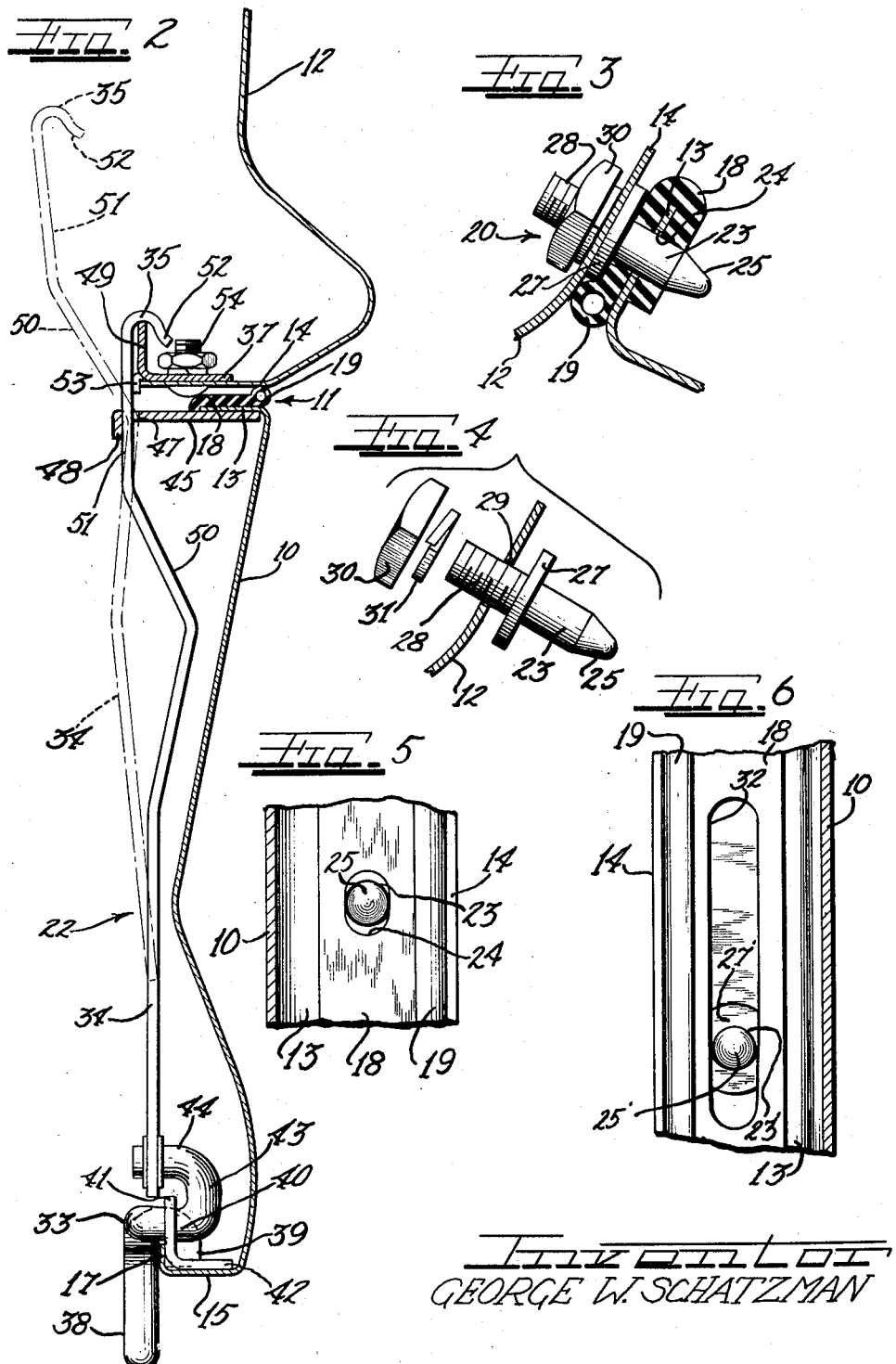

2,866,652

FENDER AND FENDER SHIELD ASSEMBLY

George W. Schatzman, Detroit, Mich., assignor to Houdaille Industries, Inc., Buffalo, N. Y., a corporation of Michigan Application March 25, 1955, Serial No. 496,753

11 Claims. (Cl. 280—153)

The present invention relates to improvements in fender and fender shield constructions, and more particularly relates to a novel manner of mounting a fender skirt or shield on a fender.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in a generally axial direction. Since such opening inherently presents a relatively unattractive outward appearance and is, at high speed operation, an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle body which is provided for access to or removal of vehicle wheels. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly from the principal body portion of the vehicle.

An important object of the present invention is to provide an improved fender and fender shield assembly in which the fender shield is detachably secured to the fender in a novel manner.

Another object of the invention is to provide a fender shield which is adapted to be assembled with a fender in a novel manner.

A further object of the invention is to provide an improved fender and fender shield assembly wherein the fender shield is applied to the fender by upward movement substantially in the plane of the shield and fender.

Still another object of the invention is to provide improved, simplified and efficient fender shield retaining means enabling rapid assembly or removal of a fender shield within a wheel access opening by simple substantially planar movement of the fender shield within the opening.

Yet another object of the invention is to provide improved means for supporting a fender shield in a wheel access opening wherein the fender about the wheel access opening is normally free from any structure which would support the shield against either vertical or inward or outward displacement, so that by the present invention a vehicle may be optionally equipped with fender shields.

Other objects, features and advantages of the present invention will be readily apparent from the following detailed description of a preferred embodiment thereof, taken in conjunction with the accompanying drawings, in which:

Figure 1 is a fragmental outer side elevational view of a fender and fender shield assembly embodying features of the invention.

Figure 2 is an enlarged vertical sectional elevational view taken substantially along the line II—II of Fig. 1.

Figure 3 is an enlarged fragmentary sectional detail view taken substantially on the line III—III of Fig. 1.

Figure 4 is an exploded assembly view showing the pin structure of Fig. 3 with the several components in separated condition.

Figure 5 is an enlarged fragmentary sectional elevational detail view taken substantially on the line V—V of Fig. 1.

Figure 6 is an enlarged fragmentary sectional elevational detail view taken substantially on the line VI—VI of Fig. 1.

Figure 7 is a fragmentary detail view similar to Fig. 5 but showing a modification.

Having reference to Figures 1 and 2, a fender shield 10 is constructed and arranged to be mounted in substantially closing relation to a wheel access opening 11 in a vehicle fender 12. About the upper and end margins of the fender shield is provided a preferably continuous inwardly extending reinforcing flange 13 which in assembly with the fender 12 is adapted to oppose an inwardly directed marginal reinforcing flange 14 defining the wheel access opening. At its bottom margin the fender shield 10 has an inturned flange 15 of substantial width provided with an upstanding reinforcing terminal flange portion 17.

By preference the fender shield 10 is constructed as a sheet material panel which may be made from suitable sheet metal such as cold rolled steel sheet, stainless steel, brass, aluminum, or the like which may conveniently be die stamped to form. Suitable finish may be applied to the outer face of the fender shield panel to afford decorative harmony with the external finish of the vehicle fender 12.

As best seen in Fig. 1, the fender shield marginal flange 13 and the fender marginal flange 14 about the wheel access opening 11 are complementary and in the assembly disposed in parallel relation. Sealing and rattle-proofing means in the present instance comprising a resilient gasket 18 preferably formed from a suitable elastomeric material such as rubber or synthetic rubber, is carried by the fender shield flange 13 and is interposed between the fender shield flange 13 and the fender flange 14. At its upper outer extremity edge, the gasket 18 is preferably provided with an enlarged hollow resiliently yieldable bead-like seal take-up formation 19 which will assure thorough sealing of the joint between the fender shield and the fender and prevent foreign material such as road dirt, water, and the like from escaping from the wheel well through the joint.

For securing the fender shield 10 detachably in place within the wheel access opening 11, separable securing and position retaining means are provided at the opposite ends of the wheel access opening and on the fender shield and at the top of the wheel access opening end of the fender shield. Herein these several means include a device 20 at the lower portion of one end of the wheel access opening and of the fender shield, a similar attachment device 21 at the lower portion of the opposite end of the wheel access opening and of the fender shield, and a central latch mechanism 22. The construction and relationship of the attachment devices is such that in assembling the fender shield 10 with the fender, the fender shield is manually positioned within the wheel access opening 11 by directing the end to be associated with the attachment device 20, which may be at the front end of the fender shield, generally upwardly and longitudinally toward the assembled relation of and with the device 20, as indicated in dot dash outline in Fig. 1. Then the fender shield is swung upwardly about the connection effected with the device 20 to effect a connection with the securing device 21 at the opposite or rear end of the fender shield and wheel access opening. This carries the fender shield up into substantially fully assembled relationship within the wheel access opening. Thereupon the latch mechanism 22 is operated to complete attachment of the fender shield to the fender.

According to the present invention the fender shield attachment device 20 comprises an elongated bracket member 23 (Figs. 1, 3 and 4) which is operatively carried by the fender flange 14 adjacent the lowermost extremity of the front end portion of the fender flange. For interengagement with the elongated member 23, the marginal flange 13 of the fender shield, together with the overlapping portion of the gasket 18 is provided with an aperture 24. In an expedient, efficient form productionwise, the elongated member 23 may be constructed as a pin of substantial diameter and length having a generally cam extremity, tapered nose or tip 25 at one end, an intermediate enlarged stop collar 27, and screw threads 28 on the portion of the shank remote from the tip 25. The threaded portion 28 of the pin shank projects in assembly through an aperture 29 in the fender flange 14. For retaining the pin 23 in place, a nut 30 is threadedly engaged with the threaded shank portion 28 to draw the stop collar 27 tightly against the fender flange 14.

A lock washer 31 may be interposed between the nut 30 and the inner face of the flange 14 to prevent loosening of the nut.

By the particular construction of the pin member 23 enabling its optional attachment, either factory installation or field installation of the fender shield is enabled. If desired, of course, the pin 23 may be secured to the flange 14 as by riveting or other mode of attachment.

By preference, the axis of the attachment pin 23 is disposed to extend downwardly as well as inwardly relative to the wheel access opening 11, as best seen in Fig. 1. This facilitates reception of the pin 23 in the aperture 24 as an incident to endwise and then upward movement of the fender shield on the general fulcrum provided by the pin into the assembled relationship to the front end of the fender at the access opening. In the present instance the tilted or oblique downward direction of the pin 23 results from oblique disposition of the fender flange 14, normal to the pin axis. Of course, where the fender flange is not so disposed, appropriate other provision may be made for the downward tilt or oblique relationship of the pin axis.

Since at least a slight amount of rocking movement upwardly of the fender shield from the initial interengagement with the pin 23 is desirable during assembly, the aperture 24 is preferably vertically elongated as shown (Fig. 5). This affords desirable clearance to enable free entry of the tapered point pin 23 into the aperture 23 during assembly and then the slight rocking relative upward movement of the fender shield toward final assembly in the wheel access opening 11. In addition, such elongation of the aperture affords substantial vertical tolerance in the assembly.

By preference and as a matter of standardization, the attachment device 21 at the opposite or rear end of the wheel access opening 11 and of the fender shield 10 is of substantially the same construction as the attachment device 20. To this end the device 21 includes an elongated member or pin structure 23' having a stop collar 27' and secured by means of a nut 30'. At its fender shield engaging end portion the pin 23' has a tapered tip 25' which is engageable in an aperture 32 in the cooperable portion of the fender shield flange 13. For clearance purposes to enable reception of the pin 23' in the aperture 32 as the fender shield is swung up from the dot dash position shown in Fig. 1 toward final assembly, the aperture 32 is preferably substantially vertically elongated as best seen in Fig. 6, especially above the pin. It will be observed that the retaining pin 23' is also preferably angled on a downwardly and inwardly oblique axis.

Undesirable movement of the fender shield panel in an inward-outward direction realtive to the fixed retaining pins 23 and 23' is resisted by having the vertical sides of the respective socket openings or apertures 24 and 32, and more especially of the gasket portions of the apertures, spaced for engagement with the sides of the pins in the final assembly position of the fender shield relative to the fender. As best seen in Figure 3, that portion of the aperture 24 extending through the fender shield flange 13 is preferably in slight clearance relation to the diameter of the pin 23, but the portion of the aperture 24 extending through the legs of the gasket 18 is formed slightly undersize relative to the diameter of the pin so as to effect a gripping engagement of the shank of the pin, thereby nicely accommodating the usual manufacturing tolerances in the metal parts while taking advantage of the resilient yieldability and compensation for any variations in pin diameter and effecting a snug, rattleproof assembly. Further, by maintaining the fender shield under upwardly directed pressure or pull or thrust, compression of the gasket 18 between the opposed fender and fender shield flanges will preclude undesirable movement, or rattling of the fender shield in service.

This efficient, rattle-free interengagement of the fender and fender shield may be enhanced by taking advantage of the downwardly oblique generally convergent relationship of the pins 23 and 23', to have the elongated cylindrical shanks of the pins engage with the lower edges defining the respective apertures 24 and 32 as demonstrated in the modification of Fig. 7 and act as cam surfaces tending to cam the engaged fender shield flange portions upwardly and endwise relative to the fender shield into tensioned relation responsive to the upward force or pressure on the fender shield. This not only tends to hold the fender shield in tensioned engagement with the pins 23 and 23', but also causes the portions of the gasket 18 intervening between the fender shield flange 13 and the contiguous portions of the fender flange 14 to be pressed more snugly into the sealing, cushioning relationship thereof between the opposing flanges.

As the final step in securing the fender shield 10 in place, the central latching mechanism 22 is operated. For this purpose the latch mechanism 22 includes a handle 33 pivotally mounted on the lower portion of the fender shield and connected to a reciprocably mounted latch member 34 in the form of an elongated lever or arm provided with an upper terminal retaining hook 35 engageable retainingly with a bracket member 37 carried by the fender flange 14.

In a convenient form, the handle member 33 comprises an elongated metallic rod member having a certain amount of inherent resiliency. At one end portion the handle member 33 is provided with a depending finger loop 38 having at its extremity an outwardly and downwardly turned interlock terminal 39 engageable about and over the upwardly extending lower marginal flange portion 17 on the fender shield. Adjacent the opposite end portion of the handle member 33 an angular offsetting journal portion 40 is provided which is engaged through a suitable bearing aperture or eye in an upstanding bearing ear 41 of an angular bearing bracket member 42 which is mounted upon the fender shield lower marginal flange 15. Projecting beyond the journal portion 40 is a handle lever portion 43 having an inwardly turned latch member actuating terminal 44 pivotally engaging the lower end portion of the latch member 34.

Vertical reciprocal guidance for the latch bar member 34 is afforded by an inwardly directed bracket plate 45 secured to the under surface of the upper marginal flange 13 of the fender shield and projecting inwardly therefrom to extend in assembly inwardly beyond the edge of the fender flange 14, as best seen in Fig. 2. At the inner marginal portion of the bracket plate 45 is provided a slot 47 through which the upper portion of the latch bar 34 extends slidably, a downturned reinforcing flange 48 being provided at the inner side of the slot 47.

The construction and relationship of the latch bar 34 to the guide bracket 45 and the cooperatnig interengagement bracket 37 on the fender flange is such that when the handle 33 has been manipulated to move the handle lever portion 43 into a more or less upward direction, the latch bar 34 is correspondingly moved upwardly in the slot 47 into a position clear of the attachment bracket 37 not only upwardly but inwardly whereby to facilitate clearance of the latch hook 35 from an upstanding inner marginal latch engageable flange 49 on the latching bracket. To accomplish not only upward but also inward movement of the head end of the latch bar, an obliquely angular translational shank portion 50 is provided on the latch bar extending on an upwardly and inwardly directed angle relative to the vertical and joining a substantially vertical upper end portion 51 of the latch bar at the upper end of which is provided the latching hook 35.

Since the fender and fender shield upper marginal flanges 14 and 13 do not have any interengaging means to hold the fender shield against displacement either outwardly or inwardly, the latch hook 35 is relied upon to afford adequate retention of the fender shield and more particularly the upper portion thereof in alignment under the fender flange 14. For this purpose, the retaining hook 35 is provided with a fairly small bight radius and with a terminal lip 52 turned slightly outwardly to provide an engagement cam that upon engaging upon the upper edge of the bracket flange 49 will cam such edge into the small radius bight of the hook as the latch arm is drawn downwardly into the latching position. This effects a secure engagement of the latch hook 35 upon the bracket flange edge and retains the upper portion of the fender shield substantially against inward or outward displacement until the latch is opened.

In order to clear the cam lip 52 of the latch hook relative to the upstanding bracket flange 49 in the latching and unlatching movements of the latch member 34, the head end generally vertical portion 51 of the latch member is of substantial length so as to extend substantially below the guide bracket plate 45 through the guide slot 47 in the latching position, and at least a sufficient distance so that during latching or unlatching movement of the latch bar, the cam lip 52 will be adequately clear above the edge of the bracket flange 49 while the head portion of the latch bar is moved either outwardly toward the retaining bracket incident to latching movement or inwardly away from the bracket incident to unlatching movement. On comparison of the full and the dot dash outline positions of the latch bar 34 in Fig. 2, it will be observed that during latching movement, that is in downward movement of the latch bar 34, the angular or translating shank section 50 of the latch bar coacting with the forward and rear edges defining the slot 47 is cammed generally outwardly as it moves downwardly and thus carries the upper or head section 51 and the hook 35 outwardly toward the retaining bracket 37 until at juncture of the oblique shank portion 50 with the upright head portion 51, the head portion 51 is parallel and adjacent to the inner side of the upstanding bracket flange 49 but with the lip 52 still clear of and substantially above the edge of the bracket flange.

Then, during further downward movement of the latch bar 34 as manipulated by the handle 33, vertical downward movement of the upper head portion 51 brings the hook 35 down into retaining, fender shield suspending latching relation to the upstanding bracket flange 49. During unlatching movement, of course the various stages of movement are reversed.

In a convenient for, the latching bracket 37 is constructed and related to the fender flange 14 in a manner to provide substantial reinforcement therefor so as to be adequately resistant to deformation from the weight of the fender shield imposed thereon through the latch member 34. To this end, the bracket member 37 preferably comprises an elongated angle bar of which the upstanding flange 49 is one of the flanges or legs and the remaining leg or flange comprises the body of the bracket and is superimposed upon the upper surface of the fender flange 14 with the upstanding flange 49 located closely adjacent to the inner edge of the fender flange. By having the elongated bracket member 37 substantially centered with respect to the position of the latch member 34, substantial reinforcing value of the bracket member to opposite sides of such position will be gained. To assist in locating the bracket member 37 properly on the fender flange, downturned locating ears or flanges 53 are provided adjacent the respective opposite ends of the bracket generally aligned with the upstanding bracket flange 49 and engageable with the inner edge of the fender flange 14 which supports the bracket. Through this arrangement, moreover, a single attaching member such as a screw 54 disposed centrally of the bracket 37 may be relied upon to secure the bracket to the fender flange 14. If preferred, of course, riveting or welding could be resorted to to secure the bracket 37, but in keeping with the suggested optional equipment nature of the assembly, consistent with the optionally mountable nature of the pin structures of the end attaching devices 20 and 21, a screw attachment of the bracket 37 is in order.

It will be understood that modifications and variations may be effected without departing from the scope of the novel concepts of the present invention.

I claim as my invention:

1. In a fender and fender shield assembly including a fender having a wheel access opening defined by an inwardly extending flange defining the wheel access opening and a fender shield having an inturned marginal flange complementary to and in assembly opposing the fender flange, the fender flange having at opposite ends of the wheel access opening elongated elements projecting into the wheel access opening, and the fender shield flange having at one end an aperture engageable with the elongated element at the corresponding end of the wheel access opening by generally longitudinal movement of the fender shield and at the opposite end of the fender shield the fender shield flange having an elongated aperture engageable with the elongated element at such end of the wheel access opening and which element comprises a headless pin, said elongated aperture and said pin being of substantially the same width and diameter, respectively, so as to define a substantially close tolerance as to predetermined facewise relationship of the fender and fender shield and the pin being engageable in the elongated aperture by endwise entry thereinto incident to upward movement of the fender shield into the wheel access opening about a fulcrum provided by the elongated element at the first mentioned end of the wheel access opening, and releasable means on the fender shield and fender for retaining the fender shield against downward displacement from the wheel access opening.

2. In a fender and fender shield assembly including a fender having a wheel access opening defined by an inwardly extending flange defining the wheel access opening and a fender shield having an inturned marginal flange complementary to and in assembly opposing the fender flange, the fender flange having at opposite ends of the wheel access opening elongated elements projecting into the wheel access opening, and the fender shield flange having at one end an aperture engageable with the elongated element at the corresponding end of the wheel access opening by generally longitudinal movement of the fender shield and at the opposite end of the fender shield the fender shield flange having an elongated aperture engageable with the elongated element at such end of the wheel access opening and which element comprises a headless pin, said elongated aperture and said pin being of substantially the same width and diameter, respectively, so as to define a substantially close tolerance as to predetermined facewise relationship of the fender and fender shield and the pin being engageable in the elongated aperture by endwise entry thereinto incident to upward movement of the fender shield into the wheel access opening about a fulcrum provided by the elongated element at the first mentioned end of the wheel access opening, and latching means carried by the fender shield and engageable with means on the fender at the upper portion of the wheel access opening for maintaining the fender shield in position against dropping out of the wheel access opening.

3. In a fender and fender shield assembly including a fender having a wheel access opening and a fender shield for substantially closing said opening, the fender and fender shield having means at the respective opposite ends of the wheel access opening and of the fender shield for maintaining the fender shield in position relative to the wheel access opening, said means in each instance including an elongated element projecting from the fender into the wheel access opening on an oblique axis downwardly and inwardly relative to the wheel access opening, the fender shield having flange structure projecting inwardly and provided with respective openings therein having lower edges engageable cammingly with said elongated elements to draw the flange structure into tight engagement with the elongated elements incident to upward force applied to the fender shield, and releasable retaining mechanism carried by the fender shield and engageable with the fender to effect said upward force.

4. In a fender and fender shield assembly including a fender having a wheel access opening and a fender shield for substantially closing said opening, the fender and fender shield having means at the respective opposite ends of the wheel access opening and of the fender shield for maintaining the fender shield in position relative to the wheel access opening, said means in each instance including an elongated element projecting from the fender into the wheel access opening, the fender shield having flange structure projecting inwardly and provided with a resilient gasket, said flange having respective openings therein within which said elongtaed elements are receivable for retaining the ends of the fender shield in alignment within the wheel access opening, and means for applying upward force to draw said flange toward the fender and compress said gasket, said last-mentioned means including a hanger latch and engagement means at the top of the fender and fender shield assembly releasably interengageable and manually operable during mounting and removal of the fender shield relative to the fender.

5. In a fender and fender shield construction including a fender having a wheel access opening with an inturned flange thereabout and a fender shield for mounting in the wheel access opening and having a flange thereabout for opposition to said fender flange, means for maintaining the end portions of the fender in alignment within the wheel access opening, and a reciprocable latch reciprocably mounted on the fender shield and movable in an up and down relationship inwardly from the fender and fender shield flanges, said latch having a hook with a small radius downwardly opening bight, and the fender flange having an upstanding bracket flange engageable by and within said latch hook bight, said bight engageably opposing the bracket flange at inner and outer sides thereof and thereby retaining the upper portion of the fender shield against inward or outward displacement relative to the fender.

6. In a fender and fender shield construction including a fender having a wheel access opening with an inturned flange thereabout and a fender shield for mounting in the wheel access opening and having a flange thereabout for opposition to said fender flange, means for maintaining the end portions of the fender in alignment within the wheel access opening, and a reciprocable latch reciprocably mounted on the fender shield and movable in an up and down relationship inwardly from the fender and fender shield flanges, said latch having an upper end hook with a small radius bight, and the fender flange having an upstanding flange structure engageable within said latch hook and thereby retaining the upper portion of the fender shield against inward or outward displacement relative to the fender, the fender shield flange having a bracket flange thereon for guiding reciprocable movements of the latch and the latch having: a substantially straight vertically extending portion immediately below said hook constructed to be guided by the bracket flange in a vertical relation when the hook is adjacent to the fender flange, and a generally downwardly and outwardly angled portion below said straight portion constructed to be guided by the bracket flange in a generally inwardly and outward direction for similarly moving the hook and straight portion when the hook is in clearance relation above the fender flange by virtue of guided movement of said straight portion.

7. In a fender and fender shield assembly including a fender having a wheel access opening with an inturned flange defining said opening and a fender shield for substantially closing said opening and provided with a latch with a latching terminal head portion, a bracket having an elongated base portion arranged for support upon said inturned flange, and an upstanding portion on said base portion engageable substantially centrally of the bracket by said latching terminal head, said base having means centrally thereof securing it to said flange and downturned flanges adjacent opposite ends thereof engageable with the inner edge of said fender flange to maintain the bracket against turning.

8. In a fender and fender shield assembly wherein a fender has a wheel access opening and a fender shield for substantially closing said opening has an inwardly directed flange, an elongated supporting element projecting from the fender into the wheel access opening comprising a pin with a tapered tip throughout of smaller diameter than the shank of the pin back of the tip, said fender shield flange having an opening therein elongated in the direction of the plane of the fender shield into which the pin is engageable endwise upon movement of the fender shield into position within the wheel access opening, said flange opening having opposed edge means defining the same engageable grippingly with diametrically opposite sides of the pin shank to retain the fender shield against inward or outward displacement relative to the fender and prevent rattling, and a hook latch carried by the fender shield engageable over said fender flange to draw the fender shield up toward the fender flange and retain the fender shield against downward displacement from the wheel access opening.

9. In a fender construction, a fender member having a wheel access opening defined by an inturned flange and adapted to receive a fender shield within the access opening, the fender flange having an opening therethrough, a pin member having a threaded portion thereof projected through said opening and including a collar engaging against the wheel access opening side of said flange, and nut means threaded upon and securing said portion of the pin member and clamping the flange between said nut means and said collar, the pin having a shank portion thereof projecting substantially beyond said collar into the wheel access opening and provided with a tapered tip which is of substantially smaller diameter than said shank whereby the pin is engageable into an aperture in the fender shield flange by movement of the fender shield flange into the wheel access opening generally in the plane of the fender.

10. In a fender shield construction, a fender shield panel having an inturned flange on the edge thereof adapted to oppose a fender flange in a wheel access opening and wherein the fender flange is provided with a pin projecting therefrom into the wheel access opening, said fender shield flange having a resilient gasket member provided with two legs engaging the respective opposite sides of said flange, the flange and said gasket member legs having aligned apertures therein providing together a pin receiving aperture for receiving the pin that projects from the fender flange, said gasket leg apertures having sides that are spaced apart slightly less than the width of the flange aperture so as to be grippingly engageable with the pin and latch means carried by the fender shield engageable with the fender and coactive with the fender carried pin for retaining the fender shield in assembled relation with the fender.

11. In a fender and fender shield assembly, a fender having a wheel access opening provided with an inturned flange defining said opening, a fender shield for disposition in substantially closing relation in said opening and having a marginal flange generally complementary to the fender flange and substantially engageable therewith in assembly, the fender flange having a plurality of pin-like retaining and locating members projecting into the wheel access opening, the fender shield flange having socket openings therein receptive of said members for retention of the fender shield substantialy against inward or outward displacement, and a hook latch carried by the fender shield and engageable over the fender flange for retaining the fender shield against axial displacement from closing position within said wheel access opening, said members comprising elongated pin shanks disposed on converging axes directed into the wheel access opening and located adjacent to opposite end portions of the wheel access opening for thereby coacting with the fender shield flange to resist inward or outward canting of the fender shield.

References Cited in the file of this patent

UNITED STATES PATENTS

| | | |
|---|---|---|
| 2,202,904 | Fergueson | June 4, 1940 |
| 2,222,619 | Jandus | Nov. 26, 1940 |
| 2,241,035 | Jandus et al. | May 6, 1941 |
| 2,261,376 | Jandus | Nov. 4, 1941 |
| 2,606,773 | Schatzman | Aug. 12, 1952 |
| 2,609,218 | Van Antwerp | Sept. 2, 1952 |
| 2,611,629 | Ludwig et al. | Sept. 23, 1952 |
| 2,621,944 | Schatzman | Dec. 16, 1952 |
| 2,655,389 | Soroka | Oct. 13, 1953 |
| 2,671,672 | Schatzman | Mar. 9, 1954 |
| 2,686,062 | Schatzman | Aug. 10, 1954 |

FOREIGN PATENTS

| | | |
|---|---|---|
| 661,839 | Great Britain | May 5, 1950 |